(12) United States Patent
　　　Erande

(10) Patent No.:　US 12,572,518 B2
(45) Date of Patent:　Mar. 10, 2026

(54) DYNAMIC OIL AND GAS DATA QUALITY VISUALIZATION SUGGESTION

(71) Applicant: Schlumberger Technology Corporation, Sugar Land, TX (US)

(72) Inventor: Mahesh Chandrashekhar Erande, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/560,513

(22) PCT Filed: May 6, 2022

(86) PCT No.: PCT/US2022/028142
　　　 § 371 (c)(1),
　　　 (2) Date: Nov. 13, 2023

(87) PCT Pub. No.: WO2022/240689
　　　 PCT Pub. Date: Nov. 17, 2022

(65) Prior Publication Data
　　　 US 2024/0256505 A1　　Aug. 1, 2024

(30) Foreign Application Priority Data
　　 May 13, 2021　　(IN) .............................. 202121021731

(51) Int. Cl.
　　 *G06F 16/215*　　　(2019.01)
　　 *G06F 16/26*　　　 (2019.01)
(52) U.S. Cl.
　　 CPC ............ *G06F 16/215* (2019.01); *G06F 16/26* (2019.01)

(58) Field of Classification Search
　　 CPC .... G06F 16/215; G06F 16/26; G06F 16/9535; G06F 16/27; G06F 21/50; G01V 2210/74; G01V 11/00; G01V 1/50; G01V 20/00; G06T 17/05
　　 USPC ......................................................... 707/690
　　 See application file for complete search history.

(56) References Cited

U.S. PATENT DOCUMENTS

| | | | | |
|---|---|---|---|---|
| 9,158,805 B1 * | 10/2015 | Kalki | .................. | G06F 16/2365 |
| 2007/0276604 A1 * | 11/2007 | Williams | ................. | G01V 1/50 |
| | | | | 702/16 |
| 2008/0126168 A1 * | 5/2008 | Carney | ................... | E21B 41/00 |
| | | | | 705/7.26 |

(Continued)

FOREIGN PATENT DOCUMENTS

WO　　　2017099716 A1　　6/2017

OTHER PUBLICATIONS

Search Report and Written Opinion of International Patent Application No. PCT/US2022/028142 dated on Sep. 1, 2022; 9 Pages.

*Primary Examiner* — Evan Aspinwall
(74) *Attorney, Agent, or Firm* — Jeffrey D. Frantz

(57) ABSTRACT

A method, apparatus, and program product dynamically suggest and/or generate data quality visualizations for users of an oil and gas data management system based upon tracked user interaction with the data management system. By tracking user interaction with various data maintained by the oil and gas data management system, a user responsible for particular data may be prompted to view a visualization associated with the quality of such data, thereby improving the user experience and in many cases leading to data quality issues being addressed in a more responsive and efficient manner.

18 Claims, 7 Drawing Sheets

(56)  References Cited

U.S. PATENT DOCUMENTS

| | | | |
|---|---|---|---|
| 2013/0083031 A1* | 4/2013 | Lehnherr | G06Q 10/06 |
| | | | 345/440 |
| 2013/0298018 A1* | 11/2013 | Aqrawi | G06F 11/3438 |
| | | | 715/704 |
| 2015/0089021 A1* | 3/2015 | Bergbauer | H04L 67/1097 |
| | | | 709/217 |
| 2015/0278407 A1* | 10/2015 | Vennelakanti | E21B 43/00 |
| | | | 703/7 |
| 2016/0034517 A1* | 2/2016 | Babai | G06Q 50/02 |
| | | | 707/688 |
| 2016/0187508 A1 | 6/2016 | Plost et al. | |
| 2018/0340411 A1* | 11/2018 | Munda | E21B 44/00 |
| 2019/0155797 A1* | 5/2019 | Nath | G06F 16/48 |
| 2019/0251072 A1* | 8/2019 | Pyle | G06F 16/2365 |
| 2020/0097847 A1* | 3/2020 | Convertino | G06F 11/3447 |
| 2020/0109618 A1 | 4/2020 | Flanagan et al. | |
| 2020/0116887 A1* | 4/2020 | Vinay | E21B 47/13 |
| 2021/0357699 A1* | 11/2021 | Saillet | G06F 18/217 |
| 2022/0205350 A1* | 6/2022 | Santana | G06F 18/214 |
| 2022/0253726 A1* | 8/2022 | Anifowose | G06N 20/00 |
| 2022/0283995 A1* | 9/2022 | Hakami | G06F 11/3428 |
| 2022/0283996 A1* | 9/2022 | Lecaillon | G06F 11/3428 |

* cited by examiner

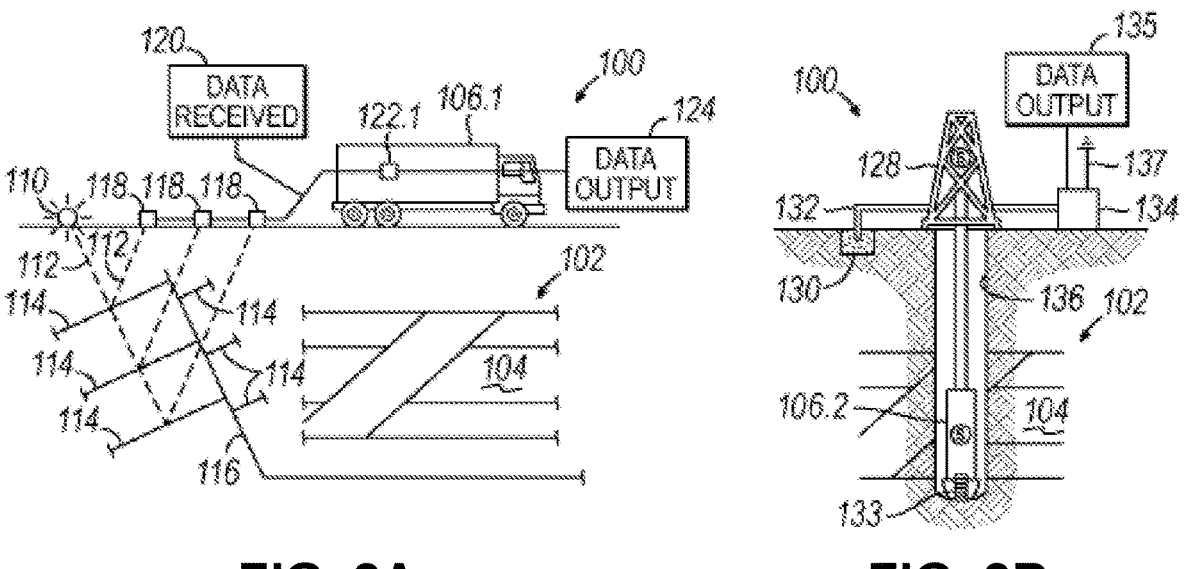
FIG. 2A
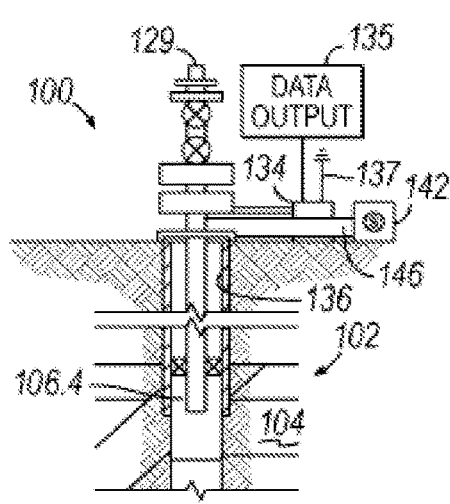
FIG. 2B
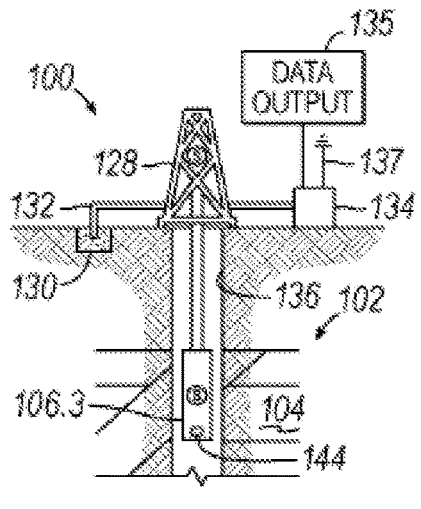
FIG. 2C
FIG. 2D

400

402

420

422

DYNAMIC OIL AND GAS DATA QUALITY VISUALIZATION SUGGESTION

CROSS-REFERENCE TO RELATED APPLICATIONS

The present application is a national stage entry under 35 U.S.C. § 371 of International Application No. PCT/US2022/028142, filed May 6, 2022, which claims priority benefit of Indian Patent Application number 202121021731, filed May 13, 2021, the entirety of which is incorporated by reference herein and should be considered part of this specification.

BACKGROUND

Many industries generate a huge amount of data each day, including, for example, the oil and gas industry. The information extracted from this data often drives decision making, and many decisions rely on accurate data and information. The quality of such data, e.g., the accuracy and the completeness of the data, may also vary considerably, particularly when data is collected using autonomous tools and sensors and automatically ingested into a data management system. Data quality management is therefore an important aspect of many data management systems to ensure that the stored data is both accurate and complete.

Oil and gas data management systems may be utilized by large numbers of users and entities, and various users or entities may have access to and/or responsibility over different collections of data in a data management system, and may further have responsibility over the quality of the data stored in the system. A data management system may therefore support the determination of and/or the management of data quality, including, for example, enabling responsibility entities to supplement and/or correct collections of data for which quality issues may exist. Given the quantity of data maintained in a typical data management system, as well as the large number of users and/or entities having access to such a system, appropriately matching users and/or entities with particular collections of data for the purpose of addressing potential quality issues can be difficult. A user having responsibility for a particular collection of data, for example, may not be aware of any quality issues with that collection of data when that user is managing numerous data collections.

SUMMARY

The embodiments disclosed herein provide a method, apparatus, and program product that dynamically suggest and/or generate data quality visualizations for users of an oil and gas data management system based upon tracked user interaction with the data management system. By tracking user interaction with various data maintained by the oil and gas data management system, a user responsible for particular data may be prompted to view a visualization associated with the quality of such data, thereby improving the user experience and in many cases leading to data quality issues being addressed in a more responsive and efficient manner.

Therefore, consistent with one aspect of the invention, a method of generating a data visualization may include tracking user interaction with oil and gas data stored in an oil and gas data management system by a user of the oil and gas data management system, where the oil and gas data stored in the oil and gas data management system includes quality information that characterizes data quality for the oil and gas data stored in the oil and gas data management system, and generating a data quality visualization suggestion for oil and gas data stored in the oil and gas data management system based upon the tracked user interaction.

Some embodiments may also include presenting the generated data quality visualization suggestion to the user, and in response to user acceptance of the generated data quality visualization suggestion, generating a data quality visualization associated with the generated data quality visualization suggestion. In addition, some embodiments may further include, in response to user acceptance of the generated data quality visualization suggestion, adding the generated data quality visualization to a dashboard of the user. Some embodiments may further include, in response to user acceptance of the generated data quality visualization suggestion, presenting the generated data quality visualization to the user.

Further, in some embodiments, the oil and gas data includes wellbore data, and the quality information includes a quality metric based on completeness and validity of the data. In some embodiments, tracking user interaction is performed by an analytics service that is separate from the oil and gas data management system. In addition, in some embodiments, tracking user interaction is performed by the oil and gas data management system. In some embodiments, generating the data quality visualization suggestion is further based upon tracked user interaction by a plurality of users. In addition, in some embodiments, generating the data quality visualization suggestion is further based upon the quality information.

Some embodiments may also include an apparatus including at least one processing unit and program code configured upon execution by the at least one processing unit to perform any of the aforementioned methods. Some embodiments may also include a program product including a computer readable medium and program code stored on the computer readable medium and configured upon execution by at least one processing unit to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

The herein-described embodiments provide a method, apparatus, and program product that dynamically suggest and/or generate data quality visualizations for users of an oil and gas data management system based upon tracked user interaction with the data management system. By tracking user interaction with various data maintained by the oil and gas data management system, a user responsible for particular data may be prompted to view a visualization associated with the quality of such data, thereby improving the user experience and in many cases leading to data quality issues being addressed in a more responsive and efficient manner.

A data quality visualization, in this regard, may be considered to include various textual, graphical, animated, visual and/or audible presentations presenting information regarding the quality of oil and gas data. In some embodiments, for example, a data quality visualization may include a graph or chart illustrating a data quality score associated with a particular collection of data managed by a data management system. Such a visualization may be used, for example, to highlight data collections having subpar quality, or data collections that are trending in an unfavorable manner, thereby enabling a user to potentially address any data quality issues that may arise with data managed by such user.

Other variations and modifications will be apparent to one of ordinary skill in the art, as will become more apparent below. However, an overview of an example technical environment, as well as oilfield operations, will be provide prior to further discussing the various technologies and techniques disclosed herein.

Hardware and Software Environment

Figure 1:
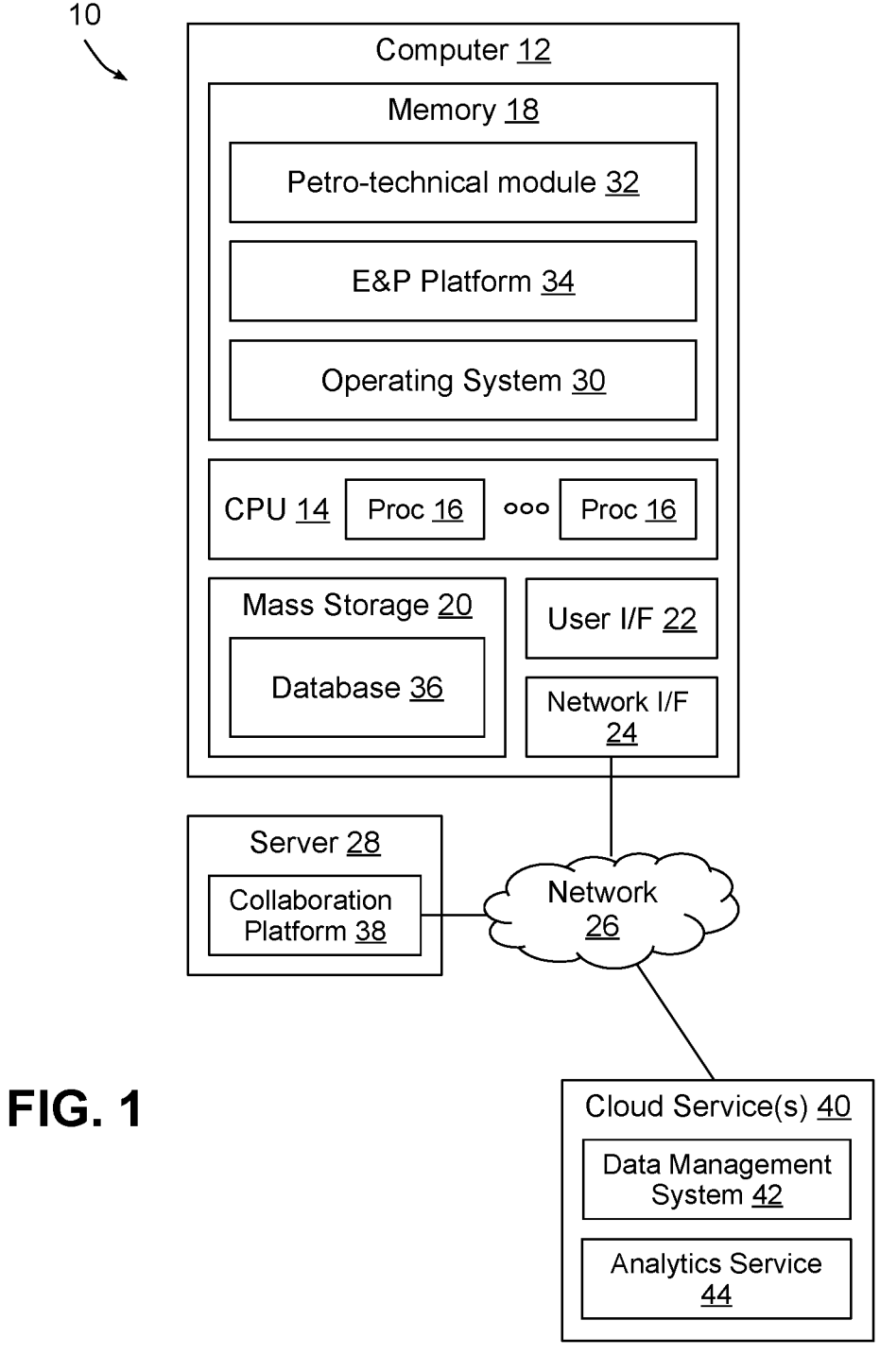
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. Data processing system 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In addition, in some embodiments, each computer 12 may be in communication with one or more cloud services 40, which may each be implemented, for example, using one or more servers or other computers, as will be appreciated by those of ordinary skill in the art having the benefit of the instant disclosure. For the purposes of the present disclosure, for example, a cloud service may implement one or both of a data management system or service 42 and an analytics service 44, the use and configuration of which will be discussed in greater detail below. It will be appreciated, however, that services 42, 44 may be implemented using different cloud services in other embodiments, so the invention is not limited to these services being hosted by the same cloud service.

It will be appreciated that the herein-described techniques may be implemented in a number of different computers, computer systems, devices, etc. In some embodiments, the herein-described techniques may be implemented within a production computer. In other embodiments, the implementation may be within an on-site computer at an oil field, within a pump itself (e.g. a smart pump), in a well or pump controller, in a cloud service, in a remote server, in another computer or electric device, or in various combinations thereof.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by data processing system 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Also, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
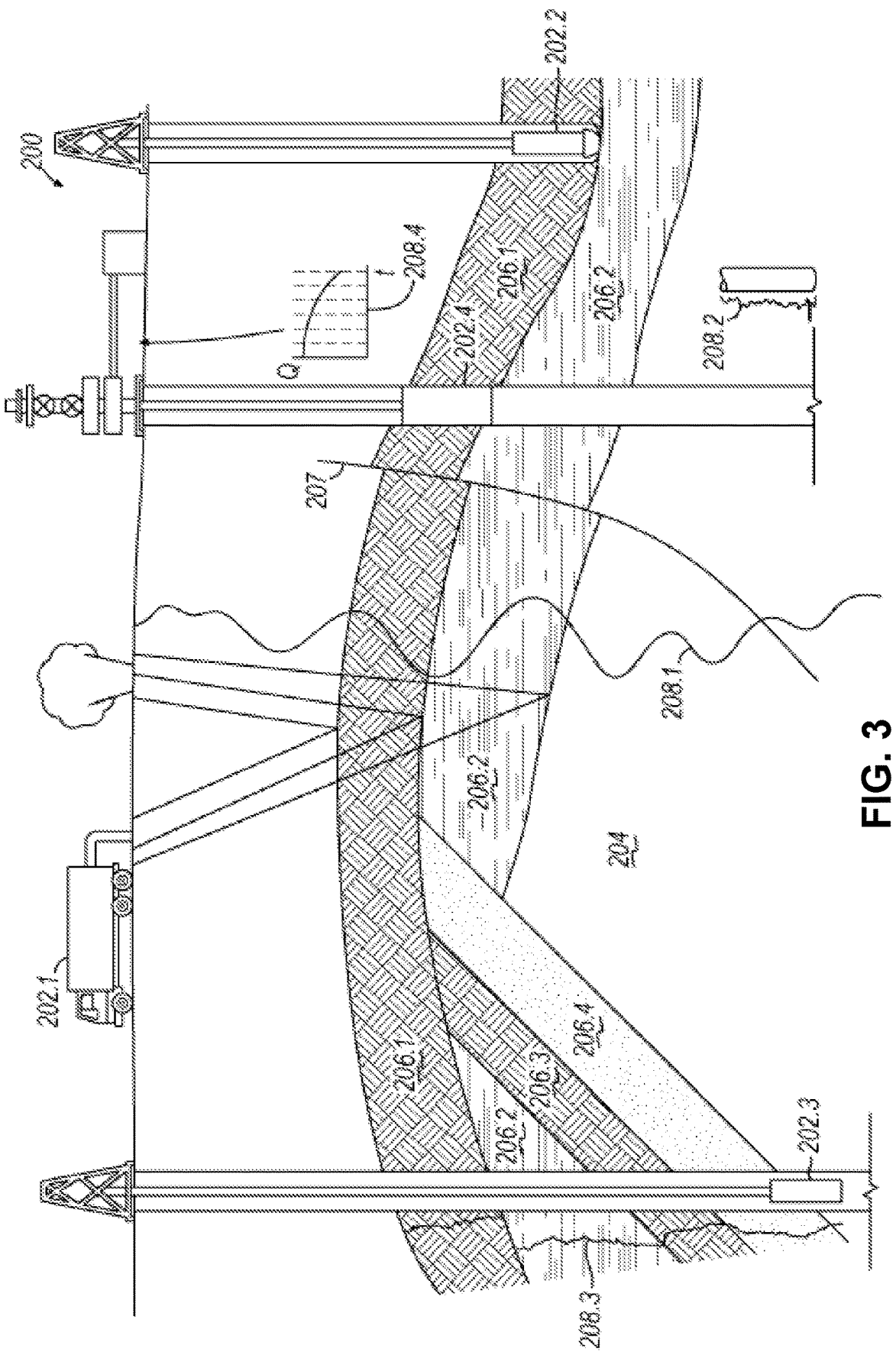
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. The static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
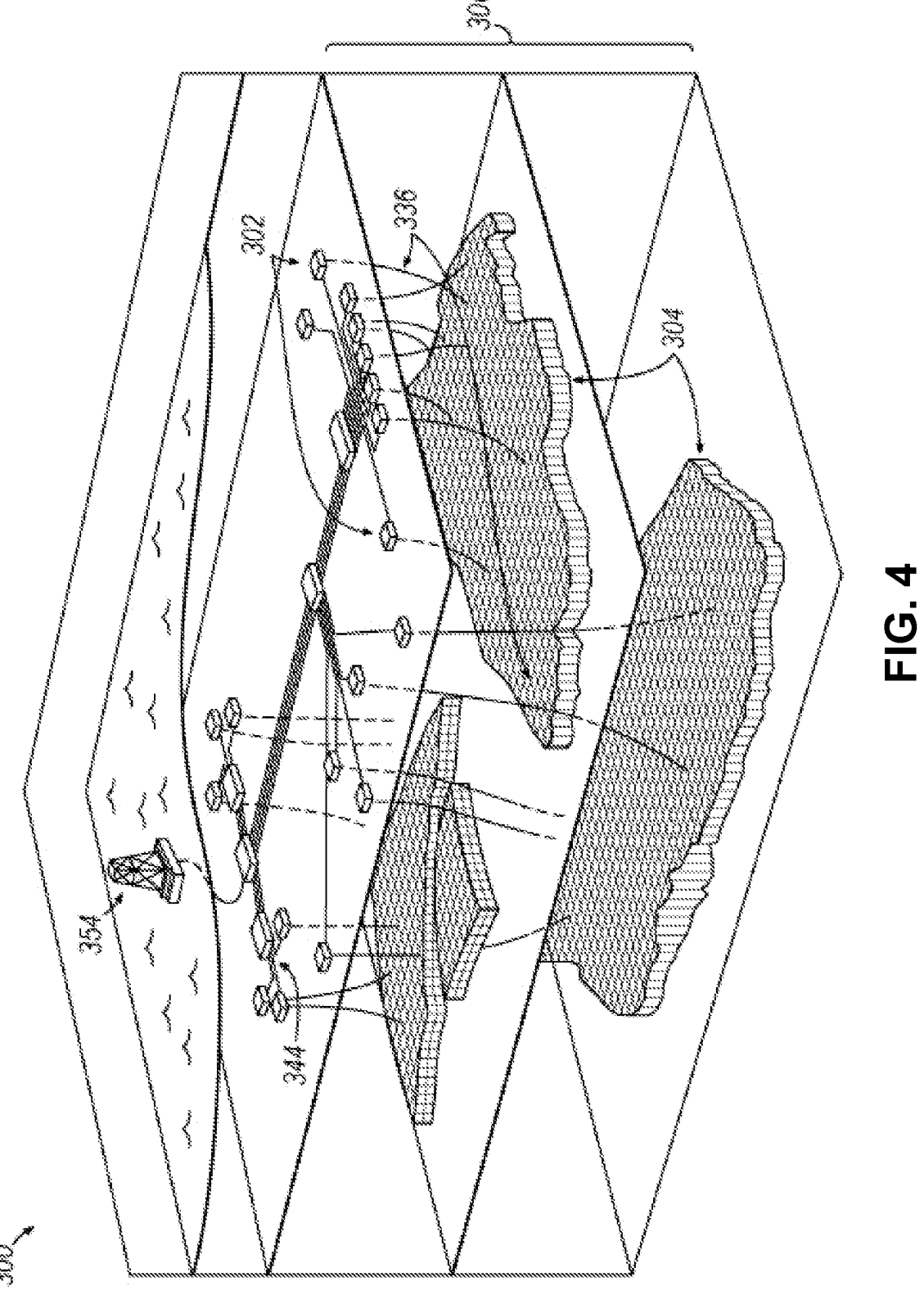
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Dynamic Oil and Gas Data Quality Visualization Suggestion

In an oil and gas data management system, a wide variety of users, who may be associated with different entities such as different companies, customers, etc., may have access to various collections of data managed by the data management system. In some embodiments, some users may be able to purchase or subscribe to various data collections, including data collections generated by users of other entities. Further, some users may be responsible for the quality of various data collections, including, for example, control over the ingestion, review and overall management of a data collection.

The data managed by an oil and gas data management system may include data associated with various aspects of the oil and gas industry, including exploration, field development, and production, and may include but is not limited to subsurface data, wellbore data, markers, seismic survey data, production data, etc. Such data may also be used by various software tools in some embodiments, e.g., for well planning, production optimization, reservoir simulation, etc. The data may be manually generated and/or collected in some embodiments, while in some embodiments, data may be obtained from sensors and automatically ingested into a data management system using automated software, e.g., using data generated by logging while drilling (LWD), measuring while drilling (MWD), or other downhole sensors, as well as various online sensors in a production system.

An oil and gas data management system may also include data quality management functionality that "scores" data stored in the data management system to reflect the quality of the data ingested into the system. The "quality" of the data may generally be considered to be a relative or absolute metric associated with the accuracy and/or the completeness of the data, and in some instances, the data quality may be represented by a numerical score between 0 and 100 that includes components associated the completeness of the data, i.e., to what extent data is incomplete (e.g., a well log missing data for one or more positions along the long), as well as the accuracy or validity of the data (e.g., due to the presence of outlying data, obviously incorrect data, data that varies from related data beyond an acceptable threshold, data that is inconsistent between different instances or repositories, etc.). Data quality may be assessed and represented in a number of different manners as will be appreciated by those of ordinary skill in the art having the benefit of the instant disclosure, so the invention is not limited the specific quality score disclosed herein. In addition, data quality may be assigned for different groupings of data in different embodiments, e.g., based upon data point, record, log, collection, data set, wellbore, reservoir, or practically any data delineation.

Data quality management, for example, may be used to identify data issues and changes by applying user-defined assessment rules to an area of interest, locate data changes or issues and automatically correct or synchronize through a combination of user-defined business rules and the results of automated assessment runs, correct and synchronize data display results in GIS, chart, or spreadsheet form, and store results in a database. Data quality management may also be used to correct quality issues, e.g., by deleting outlying data, correcting outlying data, harmonizing data, adding missing data, etc.

In the illustrated embodiment, for example, data quality management may be used to assess, and if necessary, address the data quality of wellbore data collected via well logging, though the invention is not so limited. Moreover, quality, from the standpoint of such data, may be based upon completeness of the wellbore data, e.g., including factors such as presence/absence in a well record of an ID, a name, a latitude and a longitude. Accuracy or validity may be based upon rules such as dates being consistent with associated data for the same wellbore, depths or other coordinates being consistent with associated data for the same wellbore, etc.

It will be appreciated that a vast amount of data may be managed by an oil and gas data management system, and that various users may be tasked with managing various data, data collections or data sets within the system. Moreover, with some types of data being constantly updated, it can be difficult for users of a data management system to be aware of particular data warranting attention. Some data management systems also provide users with the ability to generate a vast array of visualizations such as graphs and charts, and users may become overwhelmed with the possibilities and/or be unaware of other possibilities. Embodiments consistent with the invention address these and other issues by dynamically suggesting data quality visualizations based in part on tracked user interaction with oil and gas data tracking user interaction with oil and gas data stored in an oil and gas data management system.

Figure 5:
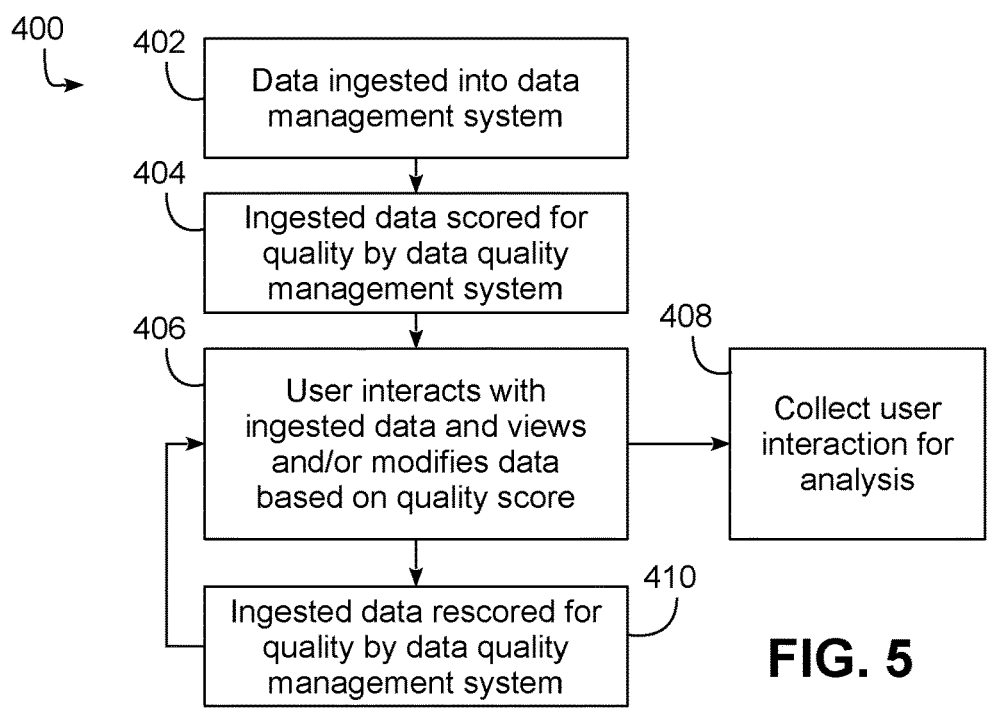
FIG. 5 illustrates a sequence of operations for tracking user interaction with a data management system in accordance with implementation of various technologies and techniques described herein.

FIG. 5, for example, illustrates a sequence of operations 400 performed by a data processing system such as that illustrated in FIG. 1 whereby data is ingested into a data management system (block 402) and the ingested data is scored for quality by a data quality management system (block 404), generating, for example, quality information such as a score that rates the overall quality of the data. Thereafter, during user interaction with the data managed by the data management system (block 406), telemetry or user interaction information may be collected for analysis (block 408). Moreover, for any user interactions where the data is modified, e.g., by a user responsible for the data, the data may be rescored for quality (block 410), such that data quality is updated whenever data is modified.

It will be appreciated, for example, that a data management system may be accessed by users who are consumers, subscribers, or purchasers of the data, and in such instances, the users generally access the data without modifying the data (i.e., the users are read-only users). In addition, a data management system may also be accessed by users having responsibility and/or authorization to modify the data, e.g., to improve the quality of the data. In both instances, the interaction of a user with the data management system, e.g., what data is accessed and/or modified by the user, the searches the user performs to locate data, the entities and/or types of entities associated with data accessed by a user (e.g., wellbores, fields, reservoirs, regions, companies, etc.), the types of operations performed by the user, etc., may be monitored to collect user interaction information for the user. In some embodiments, for example, an analytics service such as the Google Analytics service available from Google may be used to collect such information, particularly when a web-based interface is used to access the data management system. It will be appreciated that other telemetry or analytics services capable of collecting user interaction data may be used in other embodiments, so the invention is not so limited.

In this regard, it will be appreciated that a data management system and an analytics service may be implemented in different manners in different embodiments, e.g., using desktop applications, web-based applications, server-based applications, cloud-based services, distributed services, etc. Furthermore, an analytics service may be separate from a data management system in some embodiments, and may be integrated into a web browser or extension in some instances. In other instances, an analytics service may monitor network traffic or other application operations in a server or cloud-based system. In still other instances, an analytics service, or analytics functionality in general, may be integrated into a data management system or end user application therefor. Practically any architecture suitable for collecting user interaction information from a user during interaction of that user with a data management system may be used in various embodiments, so the invention is not limited to the specific embodiments illustrated herein.

Figure 6:
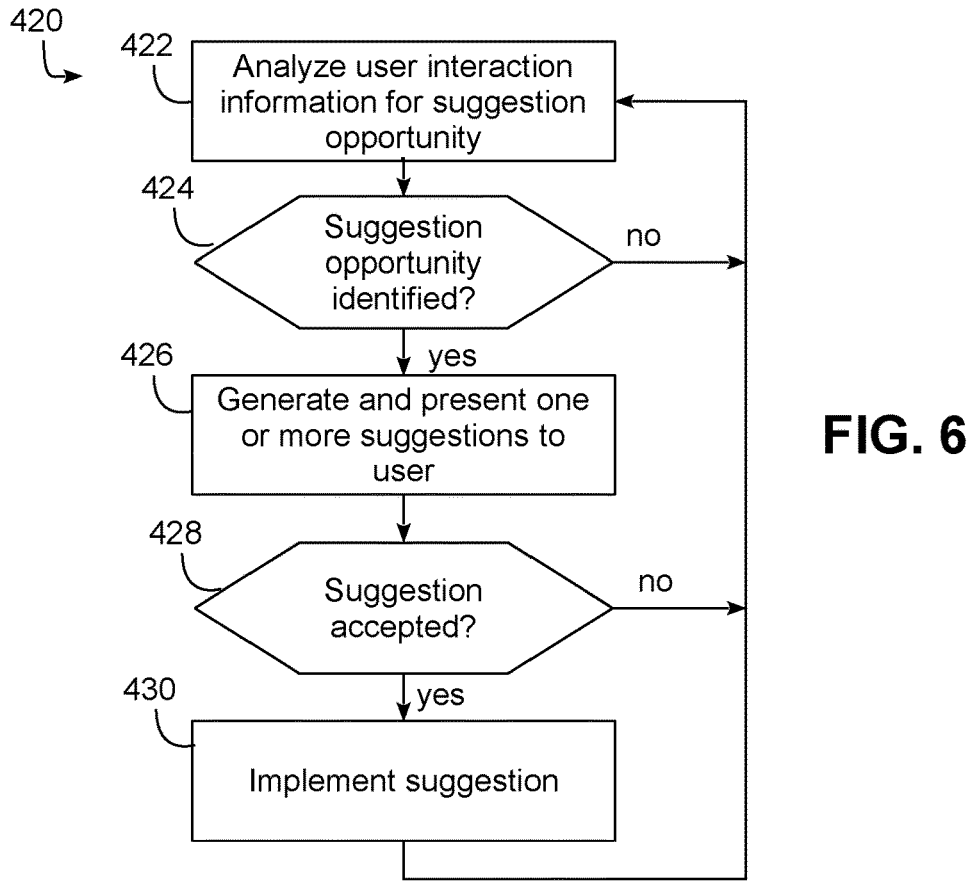
FIG. 6 illustrates a sequence of operations for generating a data quality visualization suggestion in accordance with implementation of various technologies and techniques described herein.

Now turning to FIG. 6, this figure illustrates a sequence of operations 420 for generating a data quality visualization suggestion based upon the user interaction information collected in FIG. 5. In block 422, collected user interaction information is analyzed for potential suggestion opportunities, and block 424 determines whether any such opportunities have been identified. If not, control returns to block 422, otherwise, control passes to block 426 to generate and present one or more suggestions to a user, e.g., on a user interface. A user then may determine whether to accept a suggestion, e.g., via user input directed to the user interface, and if not, control returns to block 422. If the suggestion is accepted, however, control passes to block 430 to implement the suggestion, e.g., to display the suggested data quality visualization, to add the suggested data quality visualization, etc. Control then returns to block 422 to continue to analyze for suggestion opportunities.

Figure 7:
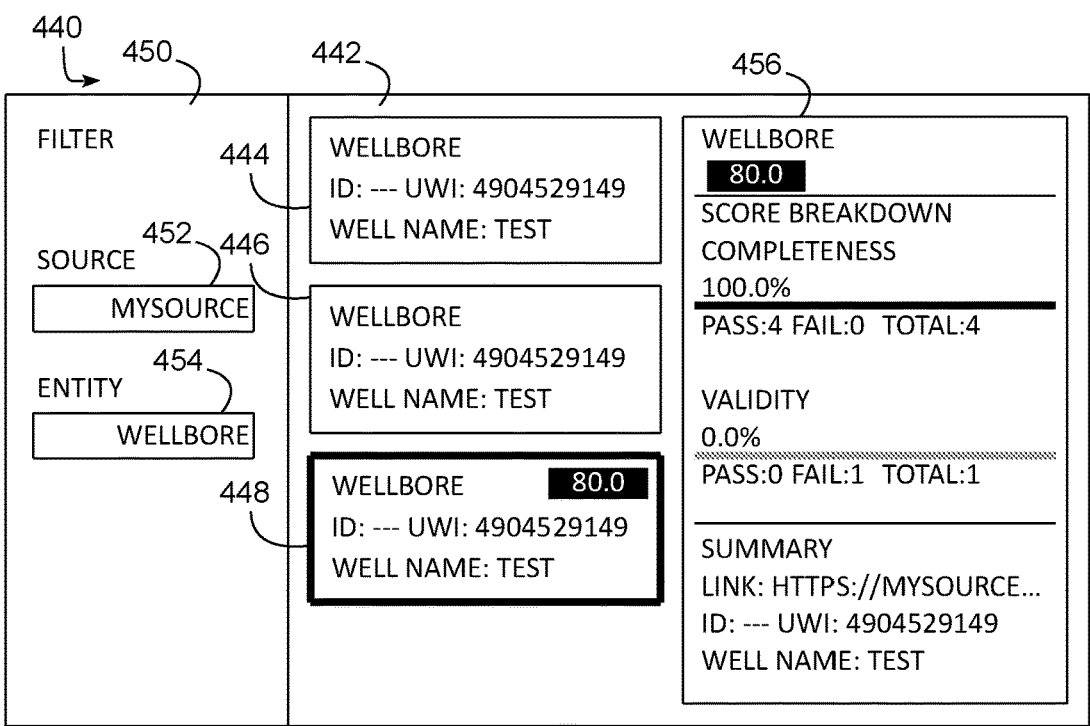
FIG. 7 illustrates an example user interface for interacting with a data management system in accordance with implementation of various technologies and techniques described herein.

Both the user interaction information that is collected, and the types of data quality visualizations that may be suggested, may vary considerably in different embodiments. FIG. 7, for example, illustrates an example user interface 440 for interacting with a data management system, e.g., a web-based user interface displayed within a browser. The user interface 440 may include a search results panel 442 illustrating several data records displayed, including records 444, 446 and 448. Data records 444-448 may be displayed, for example, as a result of a search query entered into a search or filter panel 450, e.g., matching a "Mysource" input to a source search box 452 and a "wellbore" entity input to an entity search box 454. In this illustration, data record 448 is highlight, e.g., as a result of selection by a user, and as a result, a details panel 456 is displayed including various details regarding the data record 448.

Among the details, for example, is quality information, e.g., a quality score of 80.0, which in the illustrated embodiment is based upon a completeness factor and a validity factor, and it may be seen, for example, that the completeness score is 100.0% based upon the data record passing four completeness tests, while the validity score is 0.0% based upon the data record failing a single test for validity.

Assume, for the purposes of this example, that the user's interaction with the data management system has been tracked by an analytics service (e.g., as described above in connection with FIG. 5), and as a result, it has been determined that the user has repeatedly viewed the data records associated with the "test" well name from the "Mysource" source. Also assume that it has been determined that several other users have also viewed this data and have indicated an interest in purchasing access to the data, but only if the quality is improved (e.g., via suggestions made to those users, via user input from the users indicating the interest, or in other manners as will be appreciated by those of ordinary skill in the art having the benefit of the instant disclosure).

Figure 8:
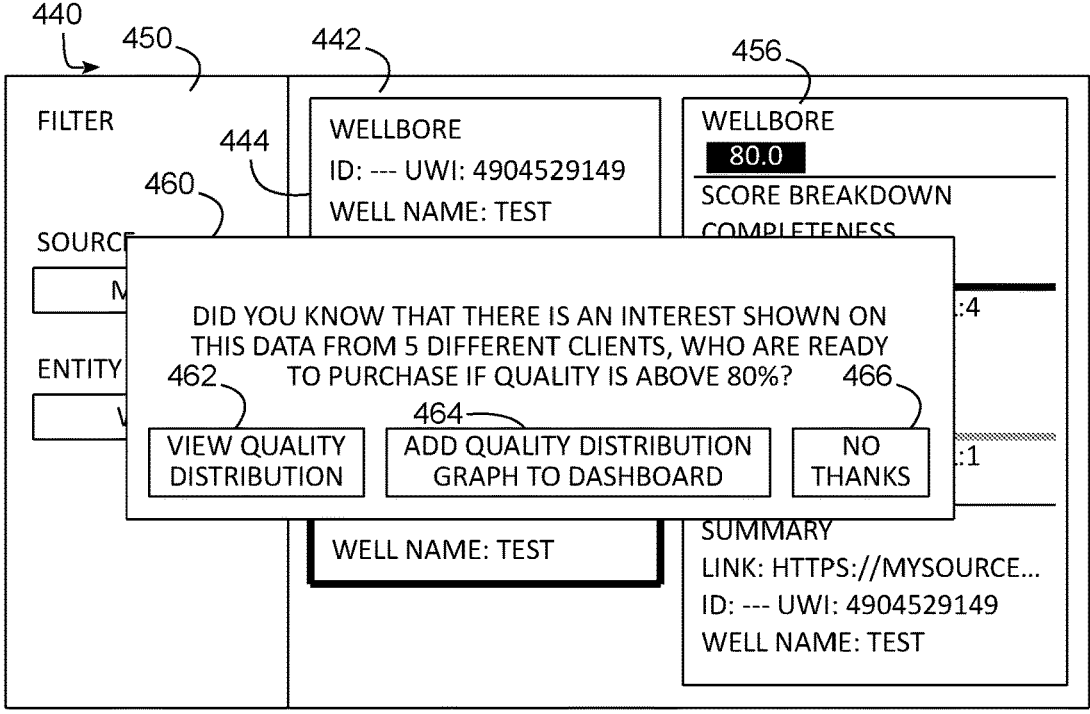
FIG. 8 illustrates the example user interface of FIG. 7, after generation of a data quality visualization suggestion.
Figure 9:
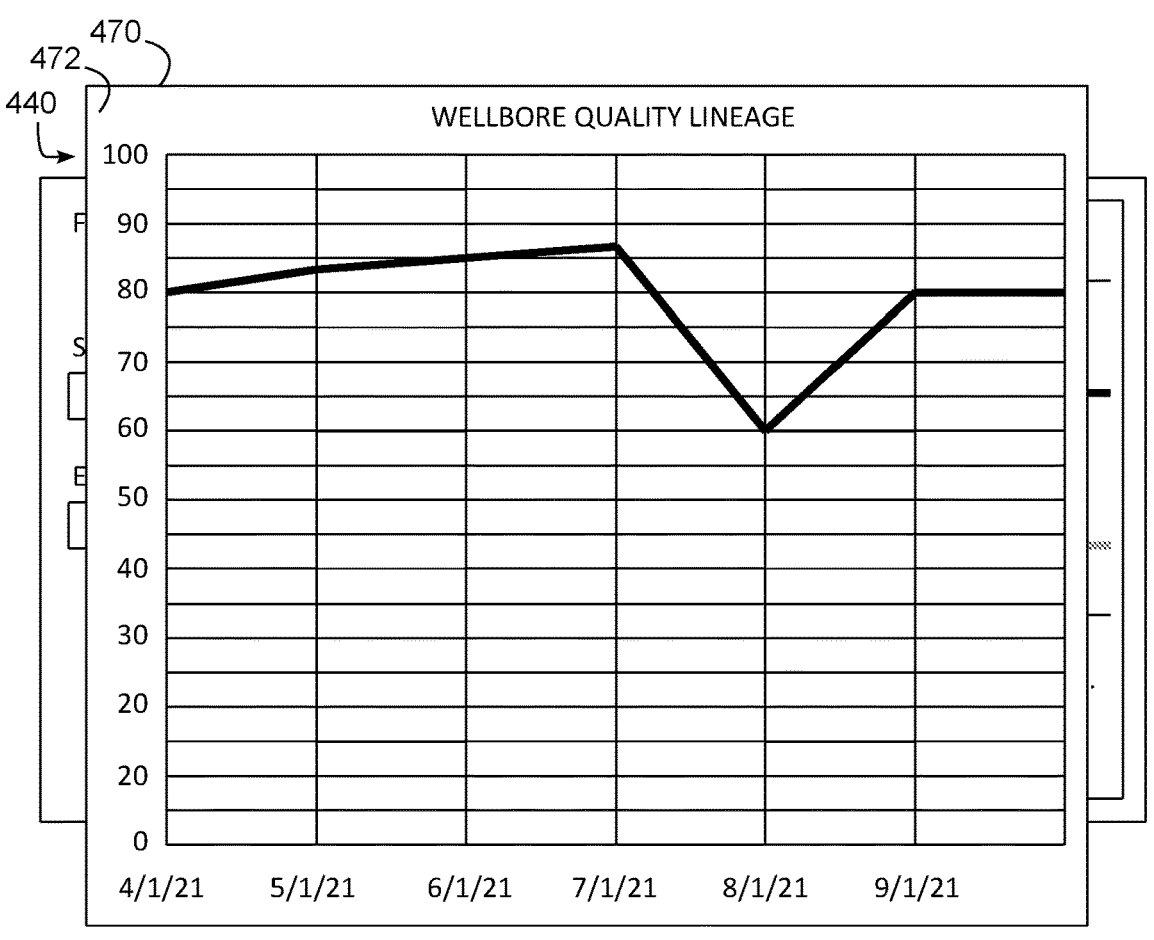
FIG. 9 illustrates the example user interface of FIG. 7, after acceptance of a data quality visualization suggestion to view the data quality visualization.

From analysis of the user interaction, therefore, one or more suggestions for data quality visualizations may be generated, e.g., as discussed above in connection with FIG. 6, and as illustrated in FIG. 8, these suggestions may be presented to the user, e.g., using a pop-up dialog box 460 including user controls (e.g., buttons) 462, 464, and 466. User control 466 may be selected by a user to decline the presented suggestions. User control 462 is associated with a first suggestion to generate and display a quality distribution visualization, e.g., a graph or chart. FIG. 9, for example, illustrates an example pop-up window 470 including a quality distribution visualization 472 that charts a quality lineage of the associated wellbore over time.

Figure 10:
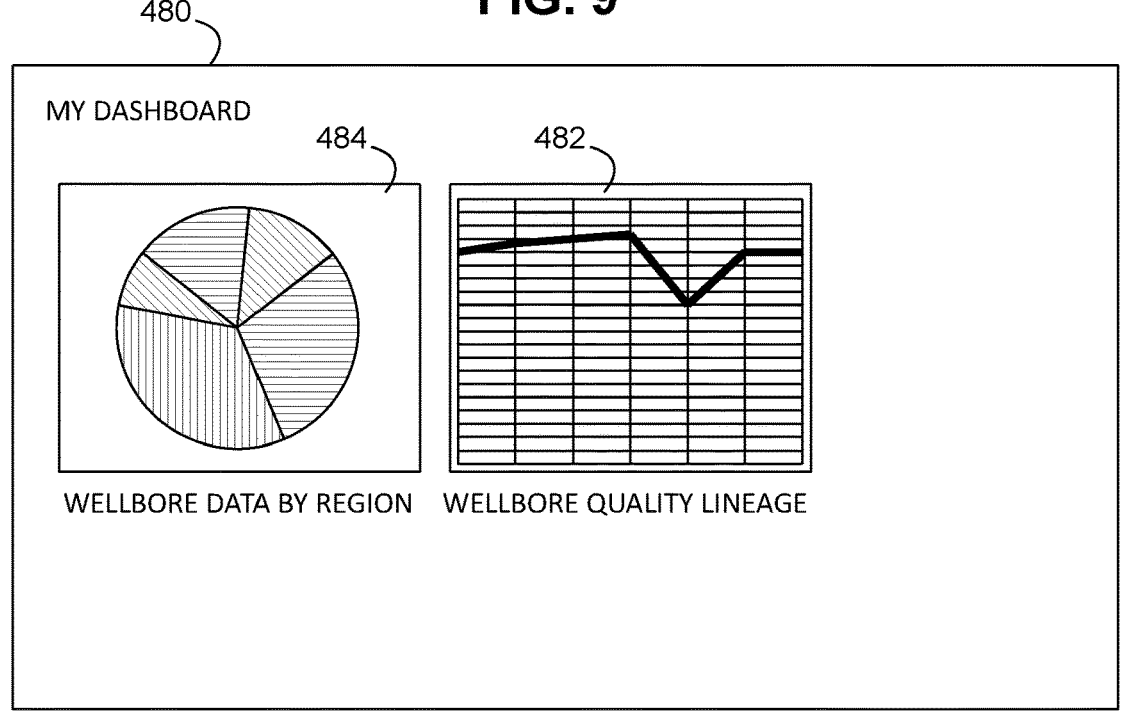
FIG. 10 illustrates the example user interface of FIG. 7, after acceptance of a data quality visualization suggestion to add the data quality visualization to a user dashboard.

Returning to FIG. 8, user control 464 is associated with a second suggestion to add a quality distribution visualization to the user's dashboard, which in this context may include any user interface that displays predetermined information to a user, e.g., a home, starting, saved, or other page, panel, frame or window. FIG. 10, for example, illustrates an example dashboard 480 to which has been added a quality distribution visualization 482, as well as additional visualizations that have been previously added or stored by a user, e.g., a region visualization 484.

It will be appreciated that the types of information collected and/or analyzed in order to generate suggestions may vary in different embodiments, and may include, for example, one or more of what data a user is accessing, how often or much the user is accessing particular data, what entities (e.g., wellbores, fields, reservoirs, production systems, regions, etc.) are associated with the data accessed by a user, feedback provided by the user (e.g., interest in a particular dataset for purchase or subscription), how the user is accessing the data (e.g., as viewer or as manager).

Thus, based on what data a user accesses, predictions may be made, for example, as to what a user may be interested, and visualizations such as charts or graphs may be suggested dynamically. As an example, if it is determined that a user has been watching the quality of markers for wellbores in the Texas region, then a suggestion may be generated to display a 2D/3D graph of the Texas region and a lineage of how the marker data quality has been changing in last year. As another example, a suggestion may be generated to display a quality graph from a specific data submitter, or to suggest that a user needs to improve the data quality so that this data is more likely to be purchased by other users.

Moreover, a wide variety of other types of suggestions may be generated in response to the analysis. A non-exclusive list of examples includes:

"Do you know that there have been 50 searches from Mysource wellbores over past 1 month? Click here to add the searches on your custom dashboard."

"Do you know that, there is an interest shown on this data from 5 different clients, who are ready to purchase Mysource wellbore data, if quality is >80%? Improve your wellbore's quality score. Click 'here' for adding quality distribution on your dashboard."

"Do you know that most of the wells from Mysource have a year defined within 1950 to 2019, while it appears that your well has a date in the year 1850. Click here to add the data distribution on your custom dashboard."

"Do you want to see data lineage of this wellbore? Click here to add the graph on your custom dashboard."

"Do you want to check quality score changes in wellbores from Mysource for your corporation? This can improve the probability of getting this good quality data sold. Click here to add the graph on your custom dashboard."

Thus, in various embodiments, a user may be better able to judge quality improvement/reduction over time, identify particular data that can be sold more easily, determine a quality trend on the data being inserted by certain field engineers, find out data which needs to be improved so that it can be sold to multiple clients, keep a closer eye on frequently accessed data and its associated properties and/or find areas where potential business growth (data sale to achieve revenue) can be obtained by improving data quality.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of generating a data visualization, the method comprising:

tracking, via one or more processors of an oil and gas data management system, user interaction with oil and gas data stored in the oil and gas data management system, wherein:

the user interaction is by a first user of the oil and gas data management system; and the oil and gas data stored in the oil and gas data management system includes at least one of: oil and gas data associated with one or more wellbores, data associated with one or more oil and gas reservoirs, data associated with one or more gas fields, data associated with one or more mines, data associated with one or more aquifers, data associated with one or more oil and gas storages, data associated with one or more oil and gas production systems, oil and gas data associated with one or more geographical regions, or data associated with one or more oil and gas subterranean facilities;

collecting, based on the tracking, telemetry information of the user interaction with the oil and gas data, wherein the telemetry information includes at least one of: information of a type of the oil and gas data the first user interacted with, information of how often the first user interacts with the oil and gas data, information of one or more entities associated with the oil and gas data the first user interacted with, information of user feedback for the oil and gas data the first user interacted with, or information of whether the first user interacted with the oil and gas data as a viewer of the oil and gas data or as a manager of the oil and gas data;

predicting, by the one or more processors of the oil and gas data management system, based at least in part upon the collected telemetry information of the user interaction, one or more data quality metric visualizations of interest, wherein:

the one or more data quality metric visualizations include at least one of: one or more charts, one or more graphs, one or more spreadsheets, or one or more geographic information system graphics (GISs), associated with the oil and gas data stored in the oil and gas data management system;

the one or more data quality metric visualizations are based on at least one of: a completeness of the oil and gas data or an accuracy of the oil and gas data; and the accuracy of the oil and gas data is determined based on one or more rules, the one or more rules including at least one of: data being consistent with associated data for a same wellbore, data being consistent with associated data for a same depth, data being consistent with associated data for depths for the same wellbore, or data being consistent with associated data for one or more coordinates for the same wellbore;

generating, by the one or more processors of the oil and gas data management system, a suggestion to add or change one or more data quality metric visualizations in a graphical user interface based on the prediction;

displaying the suggestion using the graphical user interface;

receiving an acceptance of the suggestion via the graphical user interface; and in response to receiving the acceptance, adding or changing the one or more data quality metric visualizations in the graphical user interface.

2. The method of claim 1, wherein the tracking the user interaction is performed by a data analytics system that is separate from the oil and gas data management system.

3. The method of claim 1, wherein the tracking the user interaction includes tracking user interaction with the oil and gas data by a plurality of users of the oil and gas data management system, and wherein the predicting the oil and gas data of interest and the generating the suggestion is further based upon the tracked user interaction by the plurality of users.

4. An apparatus, comprising:

at least one processing unit; and program code configured upon execution by the at least one processing unit to generate a data visualization by:

tracking, using a data analytics system, user interaction with oil and gas data stored in an oil and gas data management system, wherein:

the user interaction is by a first user of the oil and gas data management system;

the oil and gas data stored in the oil and gas data management system includes at least one of: oil and gas data associated with one or more wellbores, data associated with one or more oil and gas reservoirs, data associated with one or more gas fields, data associated with one or more mines, data associated with one or more aquifers, data associated with one or more oil and gas storages, data associated with one or more oil and gas production systems, oil and gas data associated with one or more geographical regions, or data associated with one or more oil and gas subterranean facilities;

collecting, based on the tracking, telemetry information of the user interaction with the oil and gas data, wherein the telemetry information includes at least one of: information of a type of the oil and gas data the first user interacted with, information of how often the first user interacts with the oil and gas data, information of one or more entities associated with the oil and gas data the first user interacted with, information of user feedback for the oil and gas data the first user interacted with, or information of whether the first user interacted with the oil and gas data as a viewer of the oil and gas data or as a manager of the oil and gas data;

predicting, based at least in part upon the collected telemetry information of the user interaction, one or more data quality metric visualizations of interest, wherein:

the one or more data quality metric visualizations include at least one of: one or more charts, one or more graphs, one or more spreadsheets, or one or more geographic information system graphics (GISs), associated with the oil and gas data stored in the oil and gas data management system;

the one or more data quality metric visualizations are based on at least one of: a completeness of the oil and gas data or an accuracy of the oil and gas data; and the accuracy of the oil and gas data is determined based on one or more rules, the one or more rules including at least one of: data being consistent with associated data for a same wellbore, data being consistent with associated data for a same depth, data being consistent with associated data for depths for the same wellbore, or data being consistent with associated data for one or more coordinates for the same wellbore;

generating a suggestion to add or change one or more data quality metric visualizations in a graphical user interface based on the prediction;

displaying the suggestion using the graphical user interface;

receiving an acceptance of the suggestion via the graphical user interface; and in response to receiving the acceptance, adding or changing the one or more data quality metric visualizations in the graphical user interface.

5. The apparatus of claim 4, wherein at least a portion of the program code is resident in the data analytics system, which is separate from the oil and gas data management system.

6. The apparatus of claim 4, wherein at least a portion of the program code is resident in the oil and gas data management system.

7. The apparatus of claim 4, wherein the program code is configured to:

track user interaction with the oil and gas data by a plurality of users of the oil and gas data management system; and generate the suggestion further based upon the tracked user interaction by the plurality of users.

8. A non-transitory computer-readable medium storing instructions that, when executed by at least one processor of a computing system, cause the computing system to perform operations, the operations comprising:

tracking user interaction with oil and gas data stored in an oil and gas data management system, wherein:

the user interaction is by a first user of the oil and gas data management system; and the oil and gas data stored in the oil and gas data management system includes at least one of: oil and gas data associated with one or more wellbores, data associated with one or more oil and gas reservoirs, data associated with one or more gas fields, data associated with one or more mines, data associated with one or more aquifers, data associated with one or more oil and gas storages, data associated with one or more oil and gas production systems, oil and gas data associated with one or more geographical regions, or data associated with one or more oil and gas subterranean facilities collecting, based on the tracking, telemetry information of the user interaction with the oil and gas data, wherein the telemetry information includes at least one of: information of a type of the oil and gas data the first user interacted with, information of how often the first user interacts with the oil and gas data, information of one or more entities associated with the oil and gas data the first user interacted with, information of user feedback for the oil and gas data the first user interacted with, or information of whether the first user interacted with the oil and gas data as a viewer of the oil and gas data or as a manager of the oil and gas data;

predicting, based at least in part upon the collected telemetry information of the user interaction, one or more data quality metric visualizations of interest, wherein:

the one or more data quality metric visualizations include at least one of: one or more charts, one or more graphs, one or more spreadsheets, or one or more geographic information system graphics (GISs), associated with the oil and gas data stored in the oil and gas data management system;

the one or more data quality visualizations are based on at least one of: an accuracy of the oil and gas data or a completeness of the oil and gas data; and the accuracy of the oil and gas data is determined based on one or more rules, the one or more rules including at least one of: data being consistent with associated data for a same wellbore, data being consistent with associated data for a same depth, data being consistent with associated data for depths for the same wellbore, or data being consistent with associated data for one or more coordinates for the same wellbore;

generating a suggestion to add or change one or more data quality metric visualizations in a graphical user interface based on the prediction;

displaying the suggestion using the graphical user interface;

receiving an acceptance of the suggestion via the graphical user interface; and in response to receiving the acceptance, adding or changing the one or more data quality metric visualizations in the graphical user interface.

9. The method of claim 1, wherein the completeness of the oil and gas data is based on at least one of: whether oil and gas data is missing for one or more measurement locations, whether the oil and gas data includes an identifier associated with the oil and gas data, whether the oil and gas data includes a name associated with the oil and gas data, or whether the oil and gas data includes latitude and longitude coordinates associated with the oil and gas data.

10. The method of claim 1, wherein the accuracy of the oil and gas data is based on at least at one of: whether the oil and gas data includes outliers, whether the oil and gas data varies beyond a threshold level, whether the oil and gas data is consistent with other oil and gas data obtained at a same depth, or whether the oil and gas data is consistent with other oil and gas data obtained on a same date.

11. The method of claim 1, wherein generating the suggestion comprises generating a suggestion to add one or more data quality metric visualizations of: oil and gas data associated with a particular geographic region, oil and gas data from a particular data submitter, oil and gas data that other users are interested in accessing if the data quality is improved, a data lineage of the oil and gas data, or recommendation corrections to the oil and gas data.

12. The method of claim 1, wherein the oil and gas data includes at least one of: exploration data, field development data, production data, subsurface data, markers, logging while drilling (LWD) data, measurement while drilling (MWD) data, well logging data, seismic data, formation characteristics, historical data, real-time data, user input data, economic data, measurement data, density data, resistivity data, seismic wave travel time data, production rate data, fluid composition data, flow rate data, rotary speed data, weight on bit data, torque on bit data, porosity data, permeability data, pressure data, or temperature data.

13. The non-transitory computer-readable medium of claim 8, wherein the completeness of the oil and gas data is based on at least one of: whether oil and gas data is missing for one or more measurement locations, whether the oil and gas data includes an identifier associated with the oil and gas data, whether the oil and gas data includes a name associated with the oil and gas data, or whether the oil and gas data includes latitude and longitude coordinates associated with the oil and gas data.

14. The non-transitory computer-readable medium of claim 8, wherein the accuracy of the oil and gas data is based on at least at one of: whether the oil and gas data includes outliers, whether the oil and gas data varies beyond a threshold level, whether the oil and gas data is consistent with other oil and gas data obtained at a same depth, or whether the oil and gas data is consistent with other oil and gas data obtained on a same date.

15. The method of claim 1, wherein:

the telemetry information indicates the user has interacted with oil and gas data associated with quality markers for wellbores in a geographic region; and the generating the suggestion comprises generating a suggestion to display a graph of the geographic region and a lineage of marker data quality, in the geographic region, over a time period, in response to the telemetry information.

16. The method of claim 1, wherein:

the telemetry information indicates the user has interacted with particular oil and gas data, further comprising, in response to the telemetry information, outputting a suggestion to correct oil and gas data based on other oil and gas data stored in the oil and gas data management system; and the generating the suggestion comprises generating a suggestion to add a data distribution associated with the oil and gas data and the other oil and gas data stored in the oil and gas data management system.

17. The method of claim 1, wherein:

the telemetry information indicates the user is associated with a particular corporation; and the generating the suggestion comprises generating a suggestion to add a visualization of quality score changes in the oil and gas data management system associated with the corporation over a time period.

18. The method of claim 1, wherein:

the telemetry information indicates the user has interacted multiple times with oil and gas data associated with a well;

the telemetry information indicates multiple other users have interacted with the oil and gas data associated with the well and have indicated an interest in purchasing the oil and gas data associated with the well if a quality of the oil and gas data associated with the well is improved; and the generating the suggestion comprises generating a suggestion to improve the quality of the oil and gas data associated with the well in response to the telemetry information.

\*    \*    \*    \*    \*